United States Patent [19]
Cloonan et al.

[11] Patent Number: 5,606,317
[45] Date of Patent: Feb. 25, 1997

[54] BANDWIDTH EFFICIENCY MBNB CODING AND DECODING METHOD AND APPARATUS

[75] Inventors: Thomas J. Cloonan, Downers Grove; Robert A. Novotny; Randy M. Olenz, both of Naperville; Gaylord W. Richards; Michael J. Wojcik, both of Lisle, all of Ill.

[73] Assignee: Lucent Technologies Inc., Murray Hill, N.J.

[21] Appl. No.: 353,410

[22] Filed: Dec. 9, 1994

[51] Int. Cl.$^6$ ........................................................ H03M 7/00
[52] U.S. Cl. ............................................ 341/58; 341/95
[58] Field of Search .................................... 341/58, 95

[56] References Cited

U.S. PATENT DOCUMENTS

| | | | |
|---|---|---|---|
| 4,309,694 | 1/1982 | Henry | 341/58 |
| 4,387,364 | 6/1983 | Shirota | 341/58 |
| 4,775,985 | 10/1988 | Busby | 375/25 |
| 4,853,931 | 8/1989 | Gorshe | 371/55 |
| 4,924,463 | 5/1990 | Thomas et al. | 370/105.4 |
| 5,144,304 | 9/1992 | McMahon et al. | 341/58 |
| 5,192,949 | 3/1993 | Suzuki et al. | 341/68 |
| 5,341,134 | 8/1994 | Benjauthrit | 341/58 |

OTHER PUBLICATIONS

J. Bellamy, Digital Telephony, Second Edition, (John Wiley & Sons, Inc., New York), pp 170–193.
J. Bellamy, Digital Telephony, Second Edition, (John Wiley & Sons, Inc., New York), pp. 392–399.

Primary Examiner—Marc S. Hoff
Attorney, Agent, or Firm—Jack R. Penrod

[57] ABSTRACT

A method and apparatus for encoding and decoding m-bit groups of digital data, where m is at least eight, into serial n bit groups such that each encoded serial n-bit group has sufficient data transitions therein to maintain the synchronization of a phase locked loop clock recovery circuit in a high speed serial link of a communication path. Further, this method and apparatus provides a duty cycle that is within an operational range of the ideal 50 percent, which reduces voltage drift of a.c. coupled high speed serial data links, or reduces thermal drift of optically coupled high speed serial data links.

16 Claims, 7 Drawing Sheets

FIG. 8

| 9-BIT PERMUTED PATTERN T D7–D0 | 8-BIT DECODED PATTERN B7–B0 |
|---|---|
| 0 01010101 | 00000000 |
| 0 11110000 | 10000000 |
| 0 01111000 | 01000000 |
| 0 00111100 | 00100000 |
| 0 00011110 | 00010000 |
| 0 00001111 | 00001000 |
| 0 10000111 | 00000100 |
| 0 11000011 | 00000010 |
| 0 11100001 | 00000001 |
| 0 11011000 | 01111111 |
| 0 01101100 | 10111111 |
| 0 00110110 | 11011111 |
| 0 00011011 | 11101111 |
| 0 10001101 | 11110111 |
| 0 11000110 | 11111011 |
| 0 01100011 | 11111101 |
| 0 10110001 | 11111110 |
| 0 10101010 | 11111111 |

FIG. 5

| 8-BIT PERMUTABLE PATTERN B7–B0 | 9-BIT PERMUTED PATTERN T D7–D0 |
|---|---|
| 00000000 | 0 01010101 |
| 10000000 | 0 11110000 |
| 01000000 | 0 01111000 |
| 00100000 | 0 00111100 |
| 00010000 | 0 00011110 |
| 00001000 | 0 00001111 |
| 00000100 | 0 10000111 |
| 00000010 | 0 11000011 |
| 00000001 | 0 11100001 |
| 01111111 | 0 11011000 |
| 10111111 | 0 01101100 |
| 11011111 | 0 00110110 |
| 11101111 | 0 00011011 |
| 11110111 | 0 10001101 |
| 11111011 | 0 11000110 |
| 11111101 | 0 01100011 |
| 11111110 | 0 10110001 |
| 11111111 | 0 10101010 |

BANDWIDTH EFFICIENCY MBNB CODING AND DECODING METHOD AND APPARATUS

FIELD OF THE INVENTION

The invention relates to data communication and, more particularly, to a method and apparatus for encoding data for serial communication that has improved bandwidth efficiency.

BACKGROUND OF THE INVENTION

Because of clock skew and related timing problems associated with the use of moderate-rate parallel data links for the routing of data having high aggregate bandwidths, high speed serial data links with clock recovery circuits are considered as alternatives to the moderate-bandwidth parallel data links. Several manufacturers produce multiplexer/transmitter chips that will accept data from parallel data lines and transform that data into a single high-speed data stream. These manufacturers also make receiver/demultiplexer chips which receive the high speed serial data and transform it back into parallel data. By using such devices, most of the hardware design for serial communication links is already done. However, to prevent the bit errors that occur when the clock recovery circuit loses synchronization, more than this hardware is needed to ensure synchronization between the recovered clock and the incoming serial data stream is maintained. Serial data communication links are known to have synchronization and related problems, and although there have been some solutions to these problems, all of the popular solutions still have problems that lead to bit errors.

A high speed serial data link may use some type of power driver and a metallic cable, such as coax or twinax to an electrical receiver, or some type of optical source and an optical fiber to a photonic receiver. In either case, the fundamental problem of clock distribution, described above, is encountered, i.e. synchronous clock signals cannot be distributed in parallel with the data with sufficient phase accuracy of the temporal placement of the clock edges, to prevent bit errors as the arriving data bits are inaccurately clocked into receiving registers at the receiver sub-system. The relatively short period of the data bits in the high-speed communication link operating at 1 gigabit per second or faster only exacerbates this clocking problem. Therefore, the receiver sub-system usually includes a clock recovery circuit which extracts a clock signal from the arriving data stream using a phase-locked loop rather than a clock signal distributed in parallel with the data. The recovered clock has bit edges whose phase with respect to the arriving serial data is very well defined, assuming that the phase of the data does not shift to any great degree. As a result, the recovered clock can be used to clock the arriving data into registers at the receiver sub-system. However, in order for the recovered clock to have sufficient phase accuracy to prevent bit errors, the phase lock loop must be provided with frequent logic 0 to logic 1 and logic 1 to logic 0 transitions within the serial data stream. The presence of these transitions allows the phase-locked loop to periodically correct for any accumulating phase errors in the recovered clock. Thus, to prevent phase inaccuracies in the recovered clock that lead to bit errors, it is desirable that frequent data transitions occur in the received data stream.

If a high-speed serial communication link is implemented using metallic cable, a second fundamental problem of high speed serial data links may also be encountered. The shield on a coaxial cable is typically tied to the signal ground plane of the printed circuit board from which the signal originated. If the shield is also tied to the signal ground plane of the receiver, ground loop problems, e.g. undesirable current flow and voltage drops, can develop if the ground planes on the two circuit boards develop a potential difference between them. In order to eliminate this ground loop problem, AC-coupling may be used at the receiver end, using one capacitor to connect the coaxial cable center wire to a input conductor at the receiver and another capacitor to connect the shield of the coaxial cable to a ground conductor of the receiver. As is well known, these capacitors provide low impedances for high-frequency signals such as the high speed data stream, but they also provide high impedances for the low frequency ground loop signals that might flow due to potential differences between the transmitter and receiver. However, in order for any AC-coupling to be used, the receiver system must guarantee a data stream that has an average density of logic 1's that is close to fifty percent, because a long-stream of logic 1's or logic 0's contains low-frequency signal components that will be filtered out and stored by the capacitors as DC levels, and the voltage on the output of the AC-coupled receiver will drift toward its bias point, which is usually the threshold of the decision circuit as well. As a result of this "DC wander" effect, the decision circuit will have difficulty differentiating between arriving logic 1's and arriving logic 0's, and the bit error rate on the serial communication link will increase if any noise is coupled into the link. In other words, there can be a long sequence of logic 1's in the data stream as long as it is followed by a long sequence of logic 0's such that the overall logic 1's density in a longer time window is still close to fifty percent. The noise sensitivity of a typical receiving circuit has been improving, and will probably continue to do so, such that it is now possible to have logic 1's densities in the serial link data streams that vary from the ideal fifty percent level. The use of a density of logic 1's may vary between $k_1$ and $k_2$, for $0<k_1 \leq k_2<1$, where the values of $k_1$ and $k_2$ are determined by many factors. Acceptable values for $k_1$ and $k_2$ are a function of the block size of the data, the bit rate on the high speed serial link and the data receiver circuit, i.e. the input RC time constant, the bias level, the threshold levels of the decision circuit, the amplitude of the noise signal and the desired bit error rate.

If the high-speed serial data link is implemented using optical fiber, then a third fundamental problem may be encountered. Laser driver circuits, laser sources, photodetectors, and optical receiver circuits, e.g.; amplifiers and decision circuits, comprise the primary active components within a serial fiber link, and the operation of each of these components can vary quite extensively with temperature. A data stream with a long sequence of logic 1's, i.e.; laser source on, will often dissipate more power and produce much more heat in the active components than a long sequence of logic 0's, so the temperature of the components can vary with the bit patterns. As a result, the performance of the components can also vary with the bit patterns, resulting in bit pattern dependent pulse width distortion, pulse amplitude distortion and jitter. Because of these problems, a data stream that has a very high logic 1's density or a very low logic 1's density will experience higher bit error rates. Thus, bit streams with very high logic 1's densities or very low logic 1's densities should be avoided. This requirement coincides very well with the logic 1's density requirement needed for AC-coupling with metallic cable, and like the metallic cable system, present optical components are tolerant enough to withstand some variations in the average logic 1's density range.

Many well-known and well-characterized coding and decoding schemes have been developed and used for serial communication links that transport binary (2-level) signals. Some of the better known binary coding schemes are listed below, along with their respective advantages and disadvantages.

Source Code Restriction restricts the user at the source from injecting a data stream into the serial data link with a long sequence of logic 1's or logic 0's. This approach results in simple link hardware, but forces the user to modify the data stream in order to use the serial data link. These restrictions encourage some type of coding scheme to prevent long sequences of logic 1's or logic 0's.

Dedicated Timing Bit Usage requires the source circuitry to periodically insert, e.g. once every X transmitted bits, a bit to provide a bit transition. This approach results in relatively simple link hardware, but for large values of X, it does not guarantee a logic 1's density of approximately fifty percent. Furthermore, if X is made to be a small number of bits, then this approach results in low channel bandwidth utilization.

Bit Insertion requires the data stream to be modified so that a consecutive string of Y logic 0's (or Y logic 1's) results in the addition of a logic 1 bit (or logic 0 bit) to the data stream. This approach is relatively bandwidth efficient, but it leads to more complicated link hardware and also can modify the effective data rate at which the valuable data is being transmitted—i.e., the useful data rate is effectively reduced every time a bit is inserted into the stream.

Data Scrambling of Non-Return-to-Zero (NRZ) data uses a feedback circuit on the source circuitry to convert the user data stream into a new data stream which will ideally have many transitions in it. This approach is very bandwidth efficient, but it does not guarantee that the new encoded data stream on the communication link will have many bit transitions, because there are always input patterns that may be generated by the user that will produce a long string of logic 1's or logic 0's at the output of the scrambler circuit. During any such long sequence of logic 1's or logic 0's synchronization of a clock recovery circuit will be lost and with the loss of synchronization, a large increase in data errors. In addition, if the data stream is to be actively switched to different destinations (between two consecutive bits), then the feedback algorithms used for many scrambler circuits will not permit the receiver circuitry to easily recover the initial signal without knowledge of the preceding data that might have been routed elsewhere.

The Forced Bit Errors scheme simply over-writes the user data stream whenever too many logic 1's or logic 0's have passed through the communication link. In effect, the source circuitry merely inserts bit errors in the data stream. This approach results in simple hardware, but it also can lead to high bit error rates as seen by the end users. Higher level protocols are therefore required to detect the errors, and this can result in many re-transmissions of pieces of the data stream, which means inefficient bandwidth utilization.

Manchester Encoding guarantees at least one signal transition within every bit period. This transition will occur at the beginning of the bit period and/or in the middle of the bit period. For a logic 1 bit, the signal is held in the high state during the first half of the bit period and is held in the low state during the second half of the bit period. For a logic 0 bit, the signal is held in the low state during the first half of the bit period and is held in the high state during the second half of the bit period. This approach results in an ideal logic 1's density of exactly fifty percent, so the line is said to be "DC-balanced." However, because the pulses on the line can occupy shorter time intervals that are exactly half of the time intervals in a NRZ pulse, the channel bandwidth (and the frequency of the source and receiver circuitry) must be increased by a factor of two when compared with NRZ coding techniques.

mBnB Encoding, which is a generalization of 4B5B encoding method of Sperry Corporation, now part of UNISYS, in which each of the 16 possible 4 Bit binary data blocks was encoded into a corresponding 5 Bit binary data block for data communication. Generally, mBnB encoding takes blocks of m-bits of binary data from the user data stream and converts each m-bit block into a block of n-bits of binary data using a pre-specified mapping function. The known mBnB coding schemes use look-up tables in memory to perform the encoding and decoding. Look-up tables in memory, even in ROM, take time so an encoder or decoder using a direct look-up in a memory is bandwidth limited by the access time of the memory. The communications bandwidth efficiency resulting from the use of an mBnB encoding scheme is given by m/n, so the throughput data rate and the serial communication link rate must be increased by a factor of n/m when compared to the line rate of the user data stream. Three mBnB Encoding methods are known: 4B/5B; 5B/6B and 7B/8B. These known encoding and decoding methods are mentioned in *Digital Telephony*, Second Edition, by J. Bellamy on pages 394–398. A 5B/6B encoding scheme has been used for a 565 mega bit per second data link and a 7B/8B encoding scheme has been used for a 280 mega bit per second data link. The bandwidth efficiency for the 5B/6B scheme is 83 percent and for the 7B/8B scheme is 87.5 per cent. It is desirable that the bandwidth efficiency of a serial communication link be as high as possible without sacrificing synchronization of the recovered clock.

It is an object of the present invention to provide a method for encoding groups of m data bits, where each group contains at least eight bits, into groups of n bits, where n is greater than m, and each group of n bits into which an m bit group is encoded has a density of logic 1's sufficient for clock recovery and synchronization.

It is another object of the invention to provide an apparatus that encodes m bit data groups, where m is at least eight, into n bits, where n is greater than m, using higher speed techniques than direct look-up in a memory.

SUMMARY OF THE INVENTION

Briefly stated, in accordance with one aspect of the invention, the foregoing objects are achieved by a method and apparatus for encoding m-bit groups of digital data, where m is at least eight, into serial n-bit groups such that each encoded serial n-bit group always has sufficient data transitions therein for a clock recovery circuit to maintain synchronization.

According to one aspect of the invention, the aforementioned objects are achieved by providing a method and apparatus for encoding m-bit groups of digital data into n-bit groups of digital data for transmission over a serial communication link having a clock recovery circuit at a receiving end, in which m is at least eight and is an evenly divisible by two, and n is one greater than m. This method and apparatus includes counting a number of logic 1's in each m-bit group of digital data and translating each m-bit group of digital data which has a large majority of its m-bits as logic 1's or logic 0's into a respective n-bit group in which the number of logic 1's and logic 0's are substantially equal.

According to another aspect of the invention, the foregoing objects are achieved by providing an improved method and apparatus for encoding m-bit groups of digital data into n-bit groups of digital data which have between a predetermined minimum percentage and a predetermined maximum percentage of their binary digits as logic 1's, wherein m is at least eight and is an evenly divisible by two, and n is one greater than m. The method and apparatus first counts the number of logic 1's in each m-bit group of digital data. If the number of logic 1's in any m-bit group of digital data is equal to or greater than the predetermined minimum percentage of m but equal to or less than the predetermined maximum percentage of m, a tag bit is concatenated to the m bit group to form a respective n bit group. The tag bit that is concatenated with the m-bit group is selected to make the number of logic 1's and logic 0's more nearly equal.

BRIEF DESCRIPTION OF THE DRAWINGS

While the specification concludes with the appended claims particularly pointing out and distinctly claiming the subject matter which is regarded as the invention, it is believed that the invention will be better understood from the following description taken in conjunction with the accompanying drawings in which:

FIG. 5 is an input-output truth table of the encoding circuit of FIG. 4.

FIG. 8 is an input-output truth table of the decoding circuit of FIG. 7.

DETAILED DESCRIPTION

Figure 1:
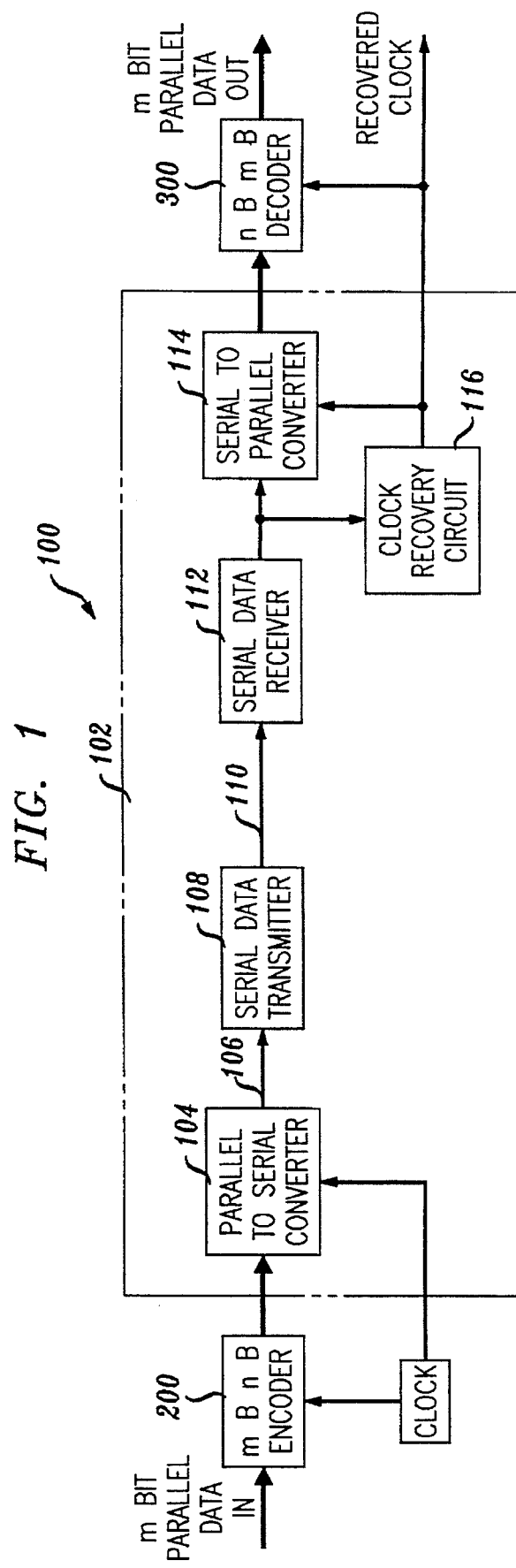
FIG. 1 is a block diagram of an mBnB encoding and decoding apparatus for facilitating clock recovery from a high speed serial bit stream.

Referring now to FIG. 1, an apparatus 100 for communicating data via a high speed serial data link 102 is shown. Serial data link 102 has a parallel to serial converter 104, which accepts parallel data inputs having n bits, and converts the n bit groups of parallel data bits into a high speed serial data bit stream. This serial bit stream is connected via line 106 to a serial data transmitter 108. Serial data transmitter receives the serial bit stream and drives the serial bit stream onto cable 110. Cable 110 may be coaxial or twin axial, in which case serial data transmitter 108 would be a broad band power driver to overcome the capacitance of the cable without distorting the data wave form. Alternatively, cable 110 may be optical, in which case serial data transmitter 108 may be a laser or similar controlled light source. In either case, high speed serial data is transmitted across cable 110 at gigabit per second rates.

At the receiving end of cable 110 is a serial data receiver 112. If cable 110 is coaxial or twinaxial, then serial data receiver 112 is just a high speed, broad band amplifier. Similarly, if cable 110 is optical, then serial data receiver 112 is a p-i-n diode or some similar type of high speed light detecting means. In either case, the output of serial data receiver 112 is connected to serial to parallel converter 114 and also to clock recovery circuit 116. The serial to parallel converter 114 outputs parallel data which was desired to be communicated to circuits to which it is ultimately connected.

As explained in the background section, serial link 102, although a desirable data communication channel, has a number of disadvantages. If the serial data transmitter 108 is a broad band power driver connected to coaxial or twin axial cable 110 and capacitively coupled to serial data receiver 112, then the quiescent operating point of the serial data receiver 112 is detrimentally affected by any net average d.c. voltage level in the communicated data. If the serial data transmitter is a laser, then a somewhat similar situation occurs with respect to heat. If the short term average duty cycle of the data varies too much from 50 percent, then temperature changes and drift will occur in the serial data transmitter 108 and in the serial data receiver 112. A high density of logic 1's causes high heat dissipation and device heating, similarly a high density of logic 0's causes device cool below the 50 percent operation range. Both situation cause operating differences from operation with the ideal 50 percent duty cycle. A clock recovery circuit often provides a clock signal that has less phase error and skew than a clock signal sent in parallel with the data. So, no matter what type of signal is being propagated across cable 110, i.e. electrical or photonic, the serial data link 102 operates best if the duty cycle of the communicated data is 50 percent.

The background section also explains the fact that clock recovery circuit 116 is almost always a phase lock loop circuit or a frequency lock loop circuit and that such circuits require statistically regular transitions from logic 0 to logic 1 and logic 1 to logic 0 in the communicated data in order to maintain an accurate phase relationship with the communicated data. During such transitions the phase or frequency of the serial data is compared to the phase or frequency of a local controlled oscillator in order to generate an error signal which is used to make phase or frequency corrections to the local controlled oscillator. If the communicated data has a long period of logic 1's or logic 0's, the phase or frequency of the local controlled oscillator can drift and actually lose data. So, to maintain phase accuracy, at least one transition per serial data bit group is very desirable.

In order to provide a duty cycle of approximately 50 percent and at least one logic transition for each serial data bit group, one embodiment of the present invention has an mBnB encoder 200 connected upstream from the parallel to serial converter 104 and an nBmB decoder 300. A specific embodiment of encoder 200 and decoder 300 with m equal to eight and n equal to nine are shown and described in greater detail with respect to FIGS. 3–6.

Figure 2:
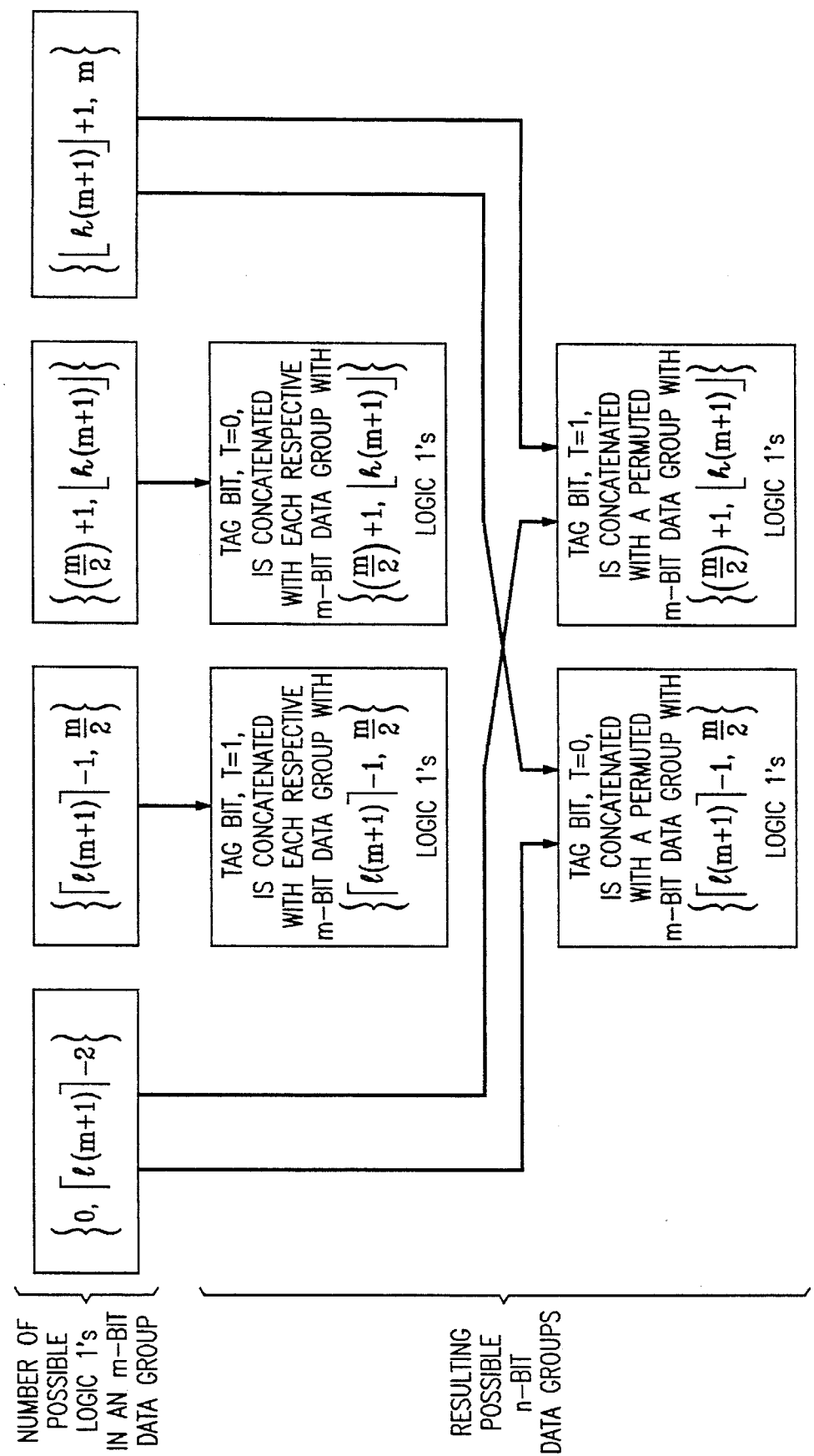
FIG. 2 is an illustration of the translation of each m-bit data group to its respective n-bit data group according to the present invention.

Generally, as illustrated by FIG. 2, an encoder 200 upon being presented with a user-generated m-bit binary group given by $$(B_{m-1} B_{m-2} \ldots B_1 B_0),$$

must output an (m+1)-bit binary group, where the (m+1)-bit binary group contains one tag bit T and m data field bits $$(T); (D_{m-1} D_{m-2} \ldots D_1 D_0)$$

which are concatenated to form an n-bit binary group as shown below:

$$(T\ D_{m-1}\ D_{m-2} \ldots D_1\ D_0).$$

The encoding method requires the encoder to count the number of logic 1's in the arriving m-bit binary group. An acceptable number of logic 1's is defined to be any number between $\{\lceil l(m+1) \rceil -1\}$ and $\{\lfloor h(m+1) \rfloor +1\}$ where $\lceil \ \rceil$ denotes the ceiling function operator and $\lfloor \ \rfloor$ denotes the floor function operator. The result of the ceiling function is the smallest integer value that is greater than or equal to its argument. Similarly, the result of the floor function is the largest integer value that is less than or equal to its argument. Furthermore, l is a predetermined low threshold percentage of logic 1's for acceptable operation and h is a predetermined high threshold percentage of logic 1's for acceptable operation. With present technology, the predetermined low threshold percentage is 30 and the predetermined high threshold percentage is 70. This encoding method ensures a duty cycle that is within a tolerance band of the ideal fifty percent duty for dc drift purposes and heating considerations. This encoding method also guarantees at least one transition per binary group to maintain synchronization of the clock recovery circuit 116.

The encoding method provides that if there is an acceptable number of logic 1's within the initial data group ($B_{m-1} B_{m-2} \ldots B_1 B_0$) according to the previous criteria, such a group is called an "unpermutable pattern" (because the data bits do not need to be and should not be permuted). For unpermutable patterns the data bits are merely copied into the data field of the output code group (called an "unpermuted pattern") given by $(D_{m-1} D_{m-2} \ldots D_1 D_0)$.

For the unpermuted patterns, $D_i = B_i$ for $0 \leq i \leq m-1$.

The tag bit T within the resulting (m+1)-bit unpermuted code group word is set according to the following rules:

T=1 if the number of logic 1's in the initial data word $\leq m/2$, and

T=0 if the number of logic 1's in the initial data word $> m/2$.

These rules tend to skew the average number of logic 1's toward a value slightly greater than fifty percent. However, changing the rules to assign T=0 if the number of logic 1's=m/2 would result in an average number of logic 1's skewed toward a value slightly less than fifty percent. So, the desired exact 50 percent duty cycle is not obtainable. However, as will be seen in subsequent steps of the method, some compensation for this skew to a value of logic 1's slightly greater than fifty percent will be made.

If the initial m-bit data group does not have an acceptable number of logic 1's within ($B_{m-1} B_{m-2} \ldots B_1 B_0$), then a slightly more complicated translation to an (m+1)-bit group ($D_{m-1} D_{m-2} \ldots D_1 D_0$) that does have an acceptable number of logic 1's is required. These user-generated bit patterns that do not have an acceptable number of logic 1's are referred to as "permutable patterns," because unlike the simple rules defined above, these patterns must be permuted to create acceptable patterns for use with the serial communication link 102 (shown in FIG. 1). Each (m+1)-bit group that is assigned to each of the permutable patterns are called a "permuted patterns." Permuted patterns can use the large spectrum of the remaining binary patterns that are not used by the unpermutable patterns. The (m+1)-bit permuted patterns produced by the encoder 200 must have an acceptable number of logic 1's, i.e., any number between $\{\lceil l(m+1) \rceil\}$ and $\{\lfloor h(m+1) \rfloor\}$. These acceptable (m+1)-bit groups for permuted patterns can be divided into two unique groups:

T=0 for the permuted patterns that have no more than m/2 bits but at least $\{\lceil l(m+1) \rceil\}$ bits set to logic 1 in their data fields, and T=1 for the permuted patterns that have more than m/2 bits set to logic 1 in the data field but have less than $\{\lfloor h(m+1) \rfloor -1\}$ bits set to logic 1 in their data fields.

For the permuted patterns, the specific bit patterns that are selected as (m+1)-bit groups should be selected with four goals in mind: 1) select the permuted patterns so that the (m+1)-bit patterns have an average number of logic 1's that is slightly less than fifty percent to counter-act the effect of the average logic 1's density being greater than fifty percent for the unpermuted code groups, 2) select the permuted patterns so that they are easily produced by simple and fast combinational logic given the permutable m-bit data patterns as an input, 3) use resulting data patterns with logic 1's densities very close to fifty percent for any particular m-bit group that has a higher probability of being transmitted (such as idle codes, etc.), and 4) use a tag bit and field bit pattern combination that is readily distinguishable from the unpermutable tag bit and field bit patterns.

Figure 3:
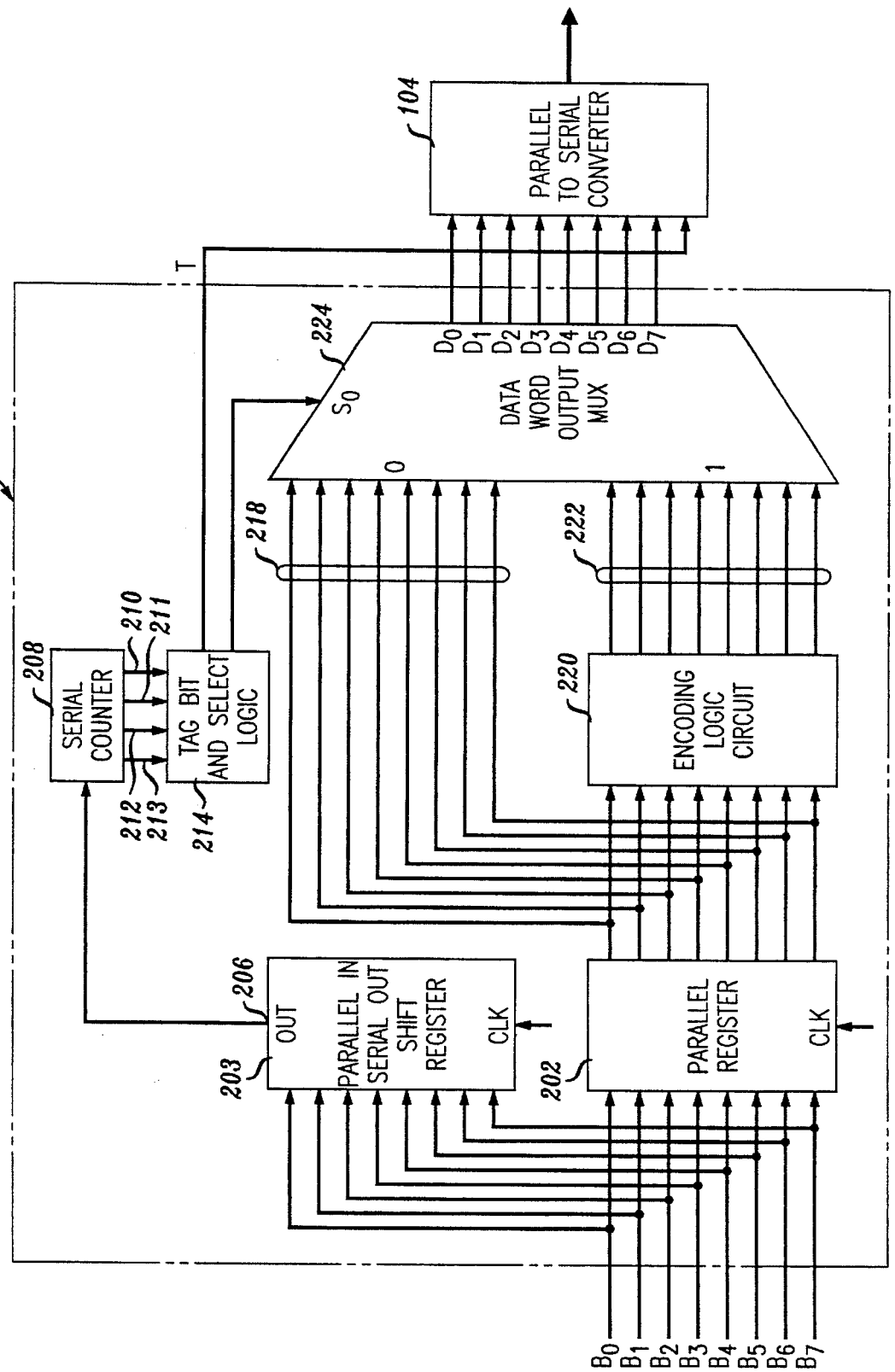
FIG. 3 is a block diagram of an 8B9B encoder sub-system.

One embodiment of an mBnB encoder, encoder 200 is shown in FIG. 3. For this particular embodiment, m=8 and n=m+1=9. This coding method is referred to as 8B9B coding. In general, the mBnB coding method according to the present invention works best if m is an even number and if n=m+1. The distribution works out better if m/2 is an integer. The maximum bandwidth efficiency obtained by any 8B9B coding method and apparatus is 0.89, and the link speed-up factor of the 8B9B coding method and apparatus is 1.125. This is an improvement over any previous mBnB encoding method.

For the 8B9B encoder 200 shown in FIG. 3, an eight bit data group, ($B_7 B_6 B_5 B_4 B_3 B_2 B_1 B_0$), is entered into parallel register 202 and parallel-in-serial-out shift register 204. The eight bit data group is temporarily stored in parallel register 202 and parallel-in-serial out shift register 204. The eight bit data group in parallel-in-serial-out shift register 204 is subsequently shifted out the serial output 206 to a data input of serial counter 208. Serial counter 208 counts the number of logic 1's in the present eight bit data group and outputs that count on lines 210, 211, 212 and 213. The number on these lines may be binary, binary coded decimal, or some other weighting method. Further, those skilled in the art will recognize that an equivalent method could be used by counting the number of logic 0's. This minor variation is deemed to be within the scope of the present invention. Lines 210–213 carry the count of the number of logic 1's to tag bit and select bit logic circuit 214. Tag bit and select bit logic circuit 214 produces a tag bit, T, that is a logic 1 if the count of logic 1's of the present eight bit group is 2, 3 or 4. If the count of logic 1's is 0, 1, 5, 6, 7 or 8, the tag bit, T, produced is a logic 0. Each tag bit, T, is concatenated with eight data bits, $D_7 D_6 D_5 D_4 D_3 D_2 D_1 D_0$, to form a nine bit group.

Tag bit and select bit logic circuit 214 also uses the count of the number of logic 1's in the present eight bit group to produce a select bit. The select bit is used to select between an eight bit group that is unpermuted and an eight bit group that is permuted. This select bit is connected to a select input, $S_0$, of an octal 2-to-1 multiplexer 224. Eight data lines 218 are connected directly from the eight outputs of parallel register 202 to the eight inputs of octal 2-to-1 multiplexer 224 that are selected if $S_0$ is a logic 0. These eight lines 218 carry unpermuted bits. The eight outputs of the parallel register 202 also are connected to eight inputs of an encoding logic circuit 220. Encoding logic circuit 220 encodes the permutable patterns having 0, 1, 7 or 8 logic 1's and translates all eighteen of these permutable patterns to permuted patterns having four logic 1's and four logic 0's. The eight outputs of encoding logic circuit 220 are connected via eight data lines 222 to the eight inputs of octal 2-to-1 multiplexer 224 that are selected if $S_0$ is a logic 1. The select bit is a logic 0 if the count of logic 1's in an eight bit group is 2, 3, 4, 5, or 6; and the select bit is a logic 1 if the count of logic 1's is 0, 1, 7 or 8. Thus, according to the present invention, if the select bit is logic 0, the eight bit output, $D_7 D_6 D_5 D_4 D_3 D_2 D_1 D_0$, of octal 2-to-1 multiplexer 224 is the same as the unpermuted eight bit input, $B_7 B_6 B_5 B_4 B_3 B_2 B_1 B_0$. On the other hand, if the select bit is logic 1, the eight bit output $D_7 D_6 D_5 D_4 D_3 D_2 D_1 D_0$ of octal 2-to-1 multiplexer 224 is the permuted eight bit output of encoding logic circuit 220 which specially translates those eight bit groups with logic 1's densities that are either too low or too high into eight bit groups with four logic 1's and four logic 0's.

Figure 4:
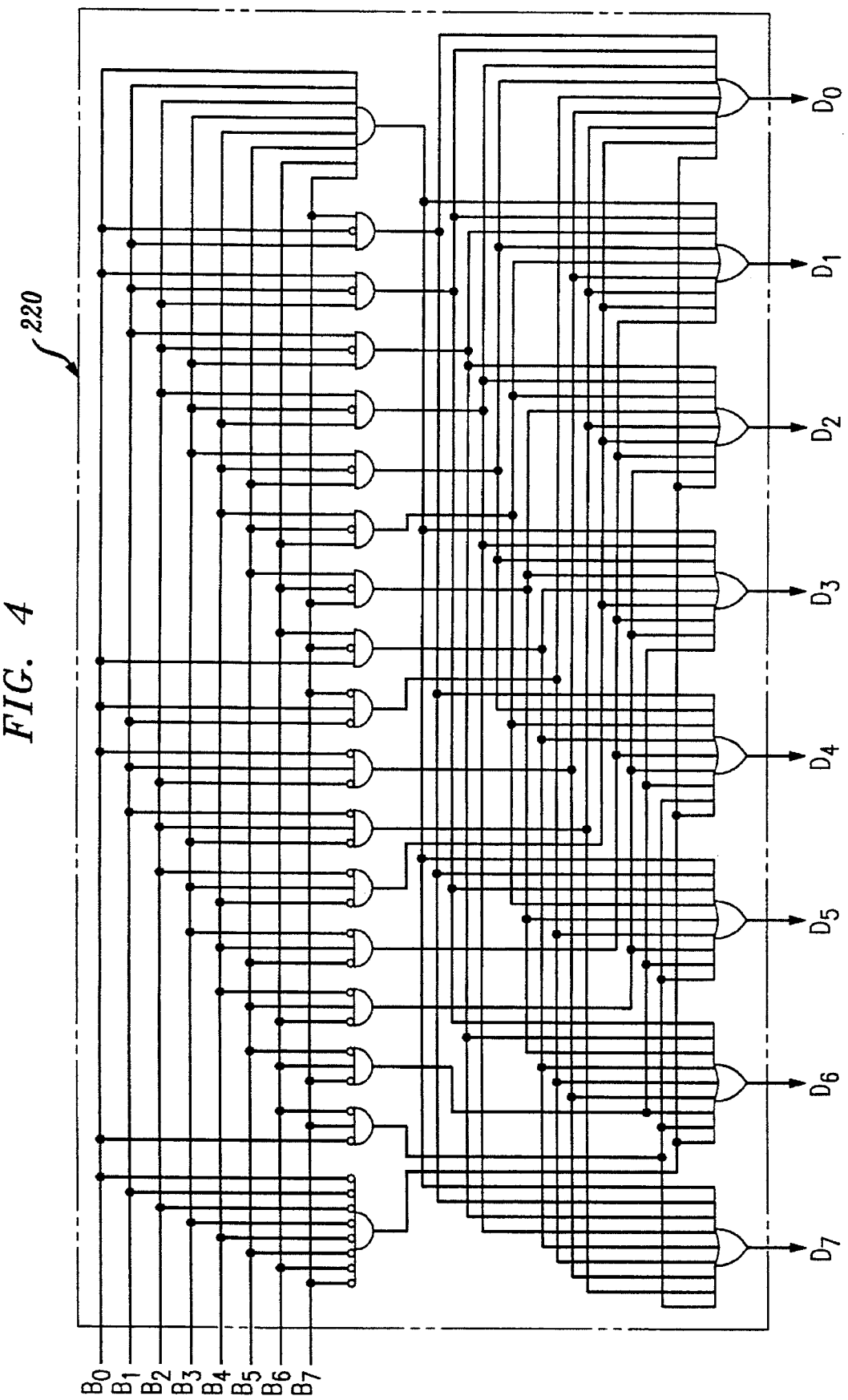
FIG. 4 is a logic diagram of an 8B9B encoding circuit according to the present invention.

Referring now to FIG. 4, a diagram of a combinational logic circuit which will provide the encoding function required of the encoding logic circuit 220 is shown. Those of average skill in the art will recognize that this is only one example of such a circuit, and FIG. 4 is given as an example and not a limitation of the invention. An input-output truth table of the binary function performed by encoding logic circuit 220 is shown by FIG. 5.

Referring back to FIGS. 1 and 3, the eight bit output, $D_7 D_6 D_5 D_4 D_3 D_2 D_1 D_0$, of octal 2-to-1 multiplexer 224 and the tag bit T from tag bit and select bit logic circuit 214 are connected to nine bit parallel to serial converter register 104, which is the data input of the serial link 102. Parallel to serial converter register 104 converts the parallel nine bit group to a serial nine bit group which is transmitted by serial data transmitter 108 across serial cable 110 to serial data receiver 112. From serial data receiver 112, each nine bit serial group is transferred to serial to parallel converter 114. At the output of the serial to parallel converter 114, each nine bit group, T $D_7 D_6 D_5 D_4 D_3 D_2 D_1 D_0$, is connected to 9B8B decoder 300.

Figure 6:
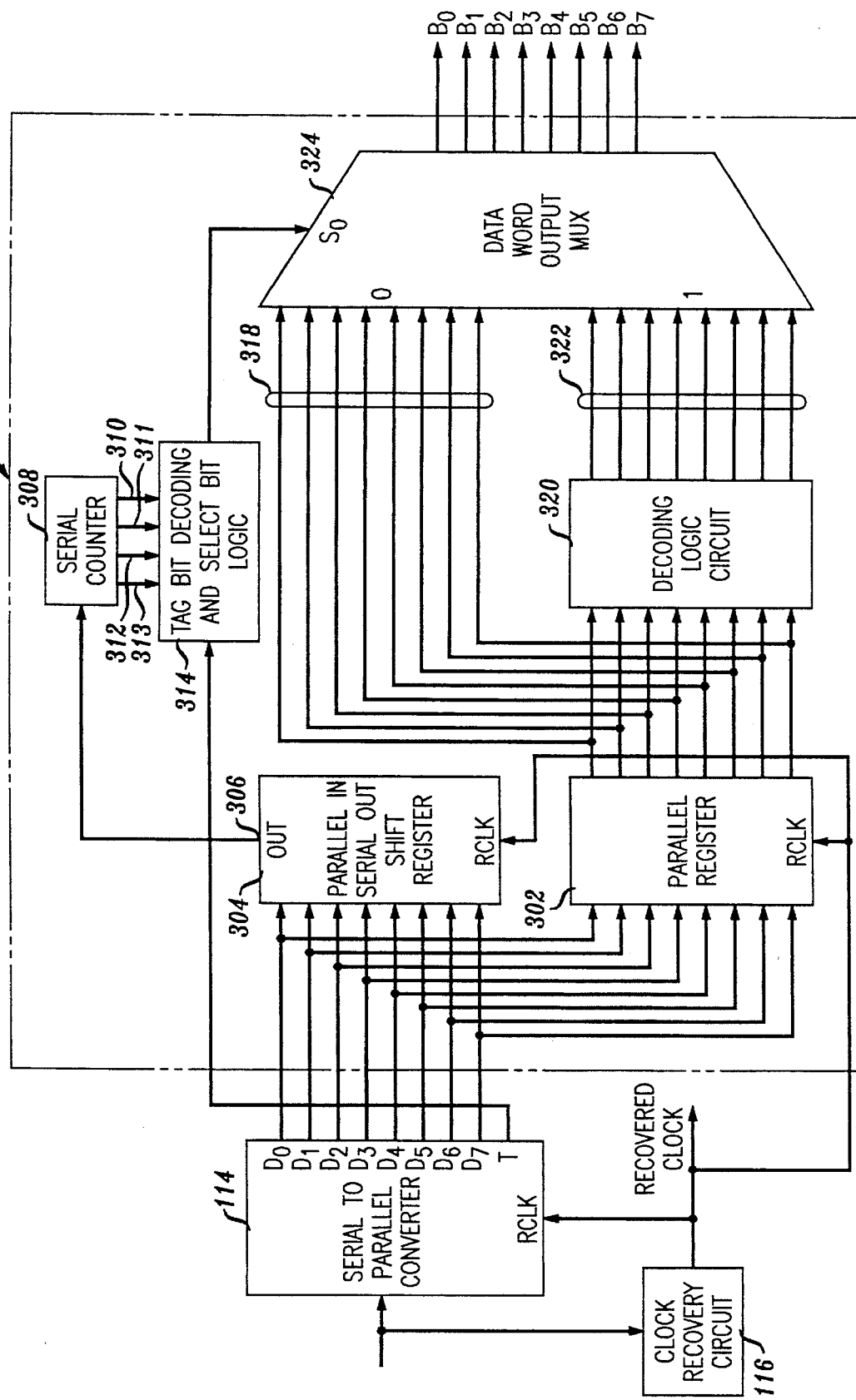
FIG. 6 is a block diagram of an 8B9B decoder subsystem.

Referring now to FIG. 6, further details of 9B8B embodiment of decoder 300 is shown. 9B8B decoder 300 has an eight bit parallel register 302 which receives each eight bit data portion, $D_7 D_6 D_5 D_4 D_3 D_2 D_1 D_0$, of each nine bit group and latches them for further processing. The recovered clock signal from clock recovery circuit 116 is used to derive a load signal that is used to load these received data bits into parallel register 302. Parallel to serial shift register 304 and tag bit decoding and select logic circuit 314 may derive similar load signals to respectively load the eight data bits, $D_7 D_6 D_5 D_4 D_3 D_2 D_1 D_0$, and the tag bit, or these data bits may be loaded using the same load signal as parallel register 302.

From the parallel to serial shift register 304, the eight data bits $D_7 D_6 D_5 D_4 D_3 D_2 D_1 D_0$ are shifted by a very high speed clock, i.e. more than eight times faster than the load signal, into serial counter 308. Serial counter 308 is a high speed counter. It counts the number of logic 1's in each eight bit data group $D_7 D_6 D_5 D_4 D_3 D_2 D_1 D_0$ and outputs a representation of each count on lines 310, 311, 312, and 313. The count from lines 310–313 is logically combined with the tag bit, T, that was transmitted with the eight bit data group by tag bit and decoding and select logic circuit 314. Tag bit decoding and select logic circuit 314 outputs a select signal that is a logic 0 if the count for the present eight bit data group is 2, 3, 5, 6 regardless of the tag bit or if the count is 4 and the tag bit, T, is a logic 1. Tag bit decoding and select logic circuit 314 outputs a select signal that is a logic 1 if the count for the present eight bit data group is 4 and the tag bit, T, is a logic 0. This select signal is connected to a select input, $S_0$, of octal 2-to-1 multiplexer 324.

Figure 7:
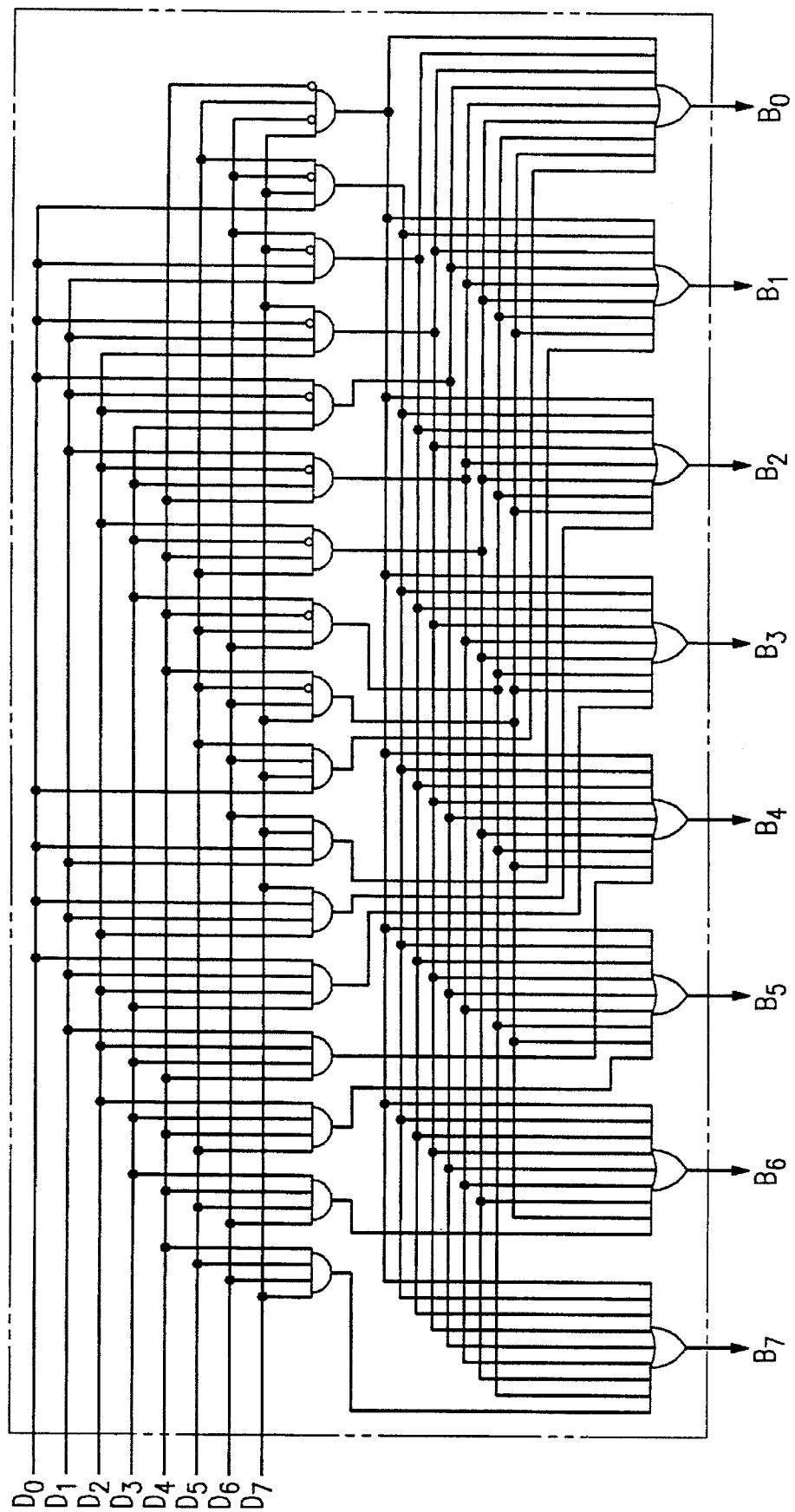
FIG. 7 is a logic diagram of an 8B9B decoding circuit according to the present invention.

The eight output bits of parallel register 302 are connected by eight data lines 318 to eight inputs of the octal 2-to-1 multiplexer 324 that are selected when the select input, $S_0$, is a logic 0. These same eight output bits of parallel register 302 are connected to eight inputs of decoding logic circuit 320. Decoding logic circuit 320 re-permutes, i.e. decodes, the eight bit group $D_7 D_6 D_5 D_4 D_3 D_2 D_1 D_0$ into eight bit data groups that had either unacceptably low number of logic 1's or unacceptably high number of logic 1's. A combinational logic circuit embodiment of decoding logic circuit 320 is shown in FIG. 7, and an input-output truth table of the binary function performed by decoding logic circuit 320 is shown in FIG. 8. Eight output bits of decoding logic circuit 320 are connected by eight data lines 322 to eight inputs of octal 2-to-1 multiplexer 324 that are selected when the select input, $S_0$, is a logic 1.

Octal 2-to-1 multiplexer 324 is switched by its select input, $S_0$, to select as its output eight unpermuted data bits if the original eight bit data group $B_7 B_6 B_5 B_4 B_3 B_2 B_1 B_0$ was one of the 228 possible eight bit data groups that had an acceptable number of logic 1's contained therein. On the other hand, octal 2-to-1 bit multiplexer 324 is switched by its select input, $S_0$, to select as its output eight re-permuted, i.e. decoded., data bits if the original eight bit data group $B_7 B_6 B_5 B_4 B_3 B_2 B_1 B_0$ was one of the 18 possible eight bit data groups that had an unacceptable number of logic 1's therein. Either way, referring now to FIGS. 1, 3 and 6, the eight bit data group output from decoder 300, i.e. octal 2-to-1 multiplexer 324, is equal to the eight bit data group input to encoder 200, i.e. parallel register 202, and the serial data link 100 carries an encoded version of each eight bit data group that provides sufficient logic transitions for clock recovery circuit 116 to maintain synchronization with the serially transmitted data for timing and control functions.

In Operation

In general, the method requires the encoder to count the number of logic 1's in the arriving m-bit binary group. (Note: The data can be serialized and passed through a simple serial counter to determine the number of logic 1's). An acceptable number of logic 1's is defined to be any whole number between a minimum percentage of an m-bit group expressed as an integer and a maximum percentage of an m-bit group expressed as an integer. If the minimum percentage was 30 percent and the maximum was 70 percent, then the expression for the range of acceptable m-bit fields is:

$$\{\lceil 0.3(m+1)\rceil - 1\} \text{ and } \{\lfloor 0.7(m+1)\rfloor\}$$

The input-output assignments selected in the truth table shown in FIG. 8 provide two other very nice benefits, because they result in very simple coding logic within the encoder 200 and very simple decoding logic within the decoder 300.

It should be noted that the counting of the logic 1's and the identification of unique bit patterns in both the encoder 200 and decoder 300 can be done in parallel in what amounts to a look ahead technique. Also, outputs of the counters 208,308 can be processed along with the tag bit to control the multiplexers 224, 324 in parallel with the transferring of the eight data bits to the multiplexers 224 and 324. As a result, the operations required to produce the output word pattern can be done in a very short period of time, limited primarily by the permissible clock rate of the counters 208 and 308. High speed logic technology, such as GaAs or ECL may be necessary for the counters 208 and 308.

Thus, it will now be understood that there has been disclosed an improved mBnB encoding and decoding method and apparatus. While the invention has been particularly illustrated and described with reference to preferred embodiments thereof, it will be understood by those skilled in the art that various changes in form, details, and applications may be made therein. For example, a 16B17B encoder and decoder method and apparatus would have an even higher bandwidth efficiency, and such a method and apparatus is contemplated, but it has many more m bit groups in the under 30 percent logic 1's and over 70 percent logic 1's that must be encoded to and decoded from acceptable permuted n bit groups and thus it takes more time to make the selections. It is accordingly intended that the appended claims shall cover all such changes in form, details and applications which do not depart from the true spirit and scope of the invention.

What is claimed as new and desired to be secured by Letters Patent of the United States is:

1. A method of encoding m-bit groups of digital data into n-bit groups of digital data for transmission over a serial communication link having a clock recovery circuit at a receiving end, wherein m is at least eight and is an evenly divisible by two and n is one greater than m, comprising the steps of:

a. counting a number of logic 1's in each m-bit group of digital data; and b. adding a tag bit that is either a logic 1 or a logic 0 dependent on the number of logic 1's in the m-bit group to form a respective n-bit group in which the number of logic 1 and logic 0 is as nearly equal as possible;

wherein to more nearly equalize the number logic 1's to the number of logic 0's in a resulting n-bit group if there are at most m/2 logic 1's in the m-bit group, the tag bit added is a logic 1 and if there are more than m/2 logic 1's in the m-bit group, the tag bit added is a logic 0.

2. A method of encoding m-bit groups of digital data into n-bit groups of digital data for transmission over a serial communication link having a clock recovery circuit at a receiving end, wherein m is at least eight and is an evenly divisible by two, and n is one greater than m; comprising the steps of:

a. counting a number of logic 1's in each m-bit group of digital data;

b. if the number of logic 1's in any m-bit group of digital data is at least equal to a predetermined minimum and at most equal to m/2, concatenating a tag bit that is a logic 1 to the m-bit group to form a respective n-bit group; and c. if the number of logic 1's in any m bit group of digital data is more than m/2 and at most equal to a predetermined maximum, concatenating a tag bit that is a logic 0 to the m-bit group to form a respective n-bit group.

3. A method of encoding m-bit groups of digital data into n-bit groups of digital data for transmission over a serial communication link having a clock recovery circuit at a receiving end, wherein m is at least eight and is an evenly divisible by two, and n is one greater than m; comprising the steps of:

a. counting a number of logic 1's in each m-bit group of digital data;

b. if the number of logic 1's in any m-bit group of digital data is at least zero and less than a predetermined minimum, translating this m-bit group of digital data to a respective m-bit group of digital data having at least said predetermined minimum number of logic 1's and at most said predetermined maximum number of logic 1's, and concatenating a tag bit to form a respective n-bit group; and c. if the number of logic 1's in any m bit group of digital data is greater than a predetermined maximum and at most equal m, translating this m-bit group to a respective m-bit group of digital data having at least said predetermined minimum number of logic 1's and at most said predetermined maximum number of logic 1's, and concatenating a tag bit to form a respective n-bit group.

4. A method of encoding m-bit groups of digital data into n-bit groups of digital data for transmission over a serial communication link having a clock recovery circuit at a receiving end, wherein m is at least eight and is an evenly divisible by two, and n is one greater than m, comprising the steps of:

a. counting a number of logic 1's in each m-bit group of digital data;

b. if the number of logic 1's in any m-bit group of digital data is greater than one less than three tenths of a ceiling function of a sum of m plus one, and not more than five tenth of m, concatenating a tag bit that is a logic 1 to the m-bit group to form a respective n-bit group;

c. if the number of logic 1's in any m bit group of digital data is more than five tenths of m and not more than seven tenths of a floor function of a sum of m plus 1, concatenating a tag bit that is a logic 0 to the m-bit group to form a respective n-bit group; and d. if the number of logic 1'sin any m bit group of digital data is at least zero and not more than two less than three tenths of a sum of m plus one, or at least one more than a floor function of seven tenths of a sum of m plus one but not more than m, translating this m bit group of digital data to a respective m bit group of digital data having m/2 logic 1's and m/2 logic 0's, and concatenating a tag bit that is a logic 0 to form a respective n-bit group.

5. A method of encoding eight-bit groups of digital data into nine-bit groups of digital data for transmission over a serial communication link having a clock recovery circuit at a receiving end, comprising the steps of:

a. counting a number of logic 1's in each eight-bit group of digital data;

b. if the number of logic 1's in any eight-bit group of digital data is two, three or four, concatenating a tag bit that is a logic 1 to this eight-bit group;

c. if the number of logic 1's in any eight-bit group of digital data is five, or six, concatenating a tag bit this a logic 0 to this eight-bit group; and d. if the number of logic 1's in any eight-bit group of digital data is zero, one, seven or eight, translating that eight-bit group of digital data to a respective eight-bit group of digital data and concatenating a tag bit that is a logic 0.

6. The method of claim 5, wherein each respective eight-bit group of digital data has four logic 1's and four logic 0's.

7. The method of claim 5, wherein step d. further comprises the steps of:

if the eight-bit group of digital data is 00000000, translating that eight-bit group of data bits to 01010101;

if the eight-bit group of digital data is 00000001, translating that eight-bit group of data bits to 11100001;

if the eight-bit group of digital data is 00000010, translating that eight-bit group of data bits to 11000011;

if the eight-bit group of digital data is 00000100, translating that eight-bit group of data bits to 10000111;

if the eight-bit group of digital data is 00001000, translating that eight-bit group of data bits to 00001111;

if the eight-bit group of digital data is 00010000, translating that eight-bit group of data bits to 00011110;

if the eight-bit group of digital data is 00100000, translating that eight-bit group of data bits to 00111100;

if the eight-bit group of digital data is 01000000, translating that eight-bit group of data bits to 01111000;

if the eight-bit group of digital data is 10000000, translating that eight-bit group of data bits to 11110000;

if the eight-bit group of digital data is 01111111, translating that eight-bit group of data bits to 11011000;

if the eight-bit group of digital data is 10111111, translating that eight-bit group of data bits to 01101100;

if the eight-bit group of digital data is 11011111, translating that eight-bit group of data bits to 00110110;

if the eight-bit group of digital data is 11101111, translating that eight-bit group of data bits to 00011011;

if the eight-bit group of digital data is 11110111, translating that eight-bit group of data bits to 10001101;

if the eight-bit group of digital data is 11111011, translating that eight-bit group of data bits to 11000110;

if the eight-bit group of digital data is 11111101, translating that eight-bit group of data bits to 01100011;

if the eight-bit group of digital data is 11111110, translating that eight-bit group of data bits to 10110001; and if the eight-bit group of digital data is 11111111, translating that eight-bit group of data bits to 10101010.

8. A method of decoding nine-bit groups of digital data, each having an encoded eight-bit group of digital data portion and a tag bit portion, into eight-bit groups of digital data; comprising the steps of:

a. counting a number of logic 1's in each encoded eight-bit group of digital data;

b. if the number of logic 1's in any encoded eight-bit group of digital data is two, three, five, or six; or four and the tag bit is logic 1, decoding each such nine bit group of digital data by removing its tag bit; and c. if the number of logic 1's in any encoded eight-bit group of digital data is four and the tag bit is logic 0, decoding each such nine bit group of digital data into a respective eight-bit group of digital data having zero, one, seven or eight logic 1's therein and removing the tag bit.

9. The method of claim 8, wherein step c. further comprises the steps of:

if the encoded eight-bit group of digital data is 01010101, translating that eight-bit group of data bits to 00000000;

if the encoded eight-bit group of digital data is 11100001, translating that eight-bit group of data bits to 00000001;

if the encoded eight-bit group of digital data is 11000011, translating that eight-bit group of data bits to 00000010;

if the encoded eight-bit group of digital data is 10000111, translating that eight-bit group of data bits to 00000100;

if the eight-bit group of digital data is 00001111, translating that eight-bit group of data bits to 00001000;

if the eight-bit group of digital data is 00011110, translating that eight-bit group of data bits to 00010000;

if the eight-bit group of digital data is 00111100, translating that eight-bit group of data bits to 00100000;

if the eight-bit group of digital data is 01111000, translating that eight-bit group of data bits to 01000000;

if the eight-bit group of digital data is 11110000, translating that eight-bit group of data bits to 10000000;

if the eight-bit group of digital data is 11011000, translating that eight-bit group of data bits to 01111111;

if the eight-bit group of digital data is 01101100, translating that eight-bit group of data bits to 10111111;

if the eight-bit group of digital data is 00110110, translating that eight-bit group of data bits to 11011111;

if the eight-bit group of digital data is 00011011, translating that eight-bit group of data bits to 11101111;

if the eight-bit group of digital data is 10001101, translating that eight-bit group of data bits to 11110111;

if the eight-bit group of digital data is 11000110, translating that eight-bit group of data bits to 11111011;

if the eight-bit group of digital data is 01100011, translating that eight-bit group of data bits to 11111101;

if the eight-bit group of digital data is 10110001, translating that eight-bit group of data bits to 11111110; and if the eight-bit group of digital data is 10101010, translating that eight-bit group of data bits to 11111111.

10. An apparatus for encoding m-bit groups of digital data into n-bit groups of digital data for transmission over a serial communication link having a clock recovery circuit at a receiving end, wherein m is at least eight and is an evenly divisible by two and n is one greater than m, comprising:

means for counting a number of logic 1's in each m-bit group of digital data; and means responsive to said counting means for adding a tag bit that is either a logic 1 or a logic 0 dependent on the number of logic 1's in the m-bit group to form a respective n-bit group in which the number of logic 1 and logic 0 is as nearly equal as possible;

wherein to more nearly equalize the number logic 1's to the number of logic 0's in a resulting n-bit group if there are at most m/2 logic 1's in the m-bit group, the tag bit added is a logic 1 and if there are more than m/2 logic 1's in the m-bit group, the tag bit added is a logic 0.

11. A system having an eight-bit parallel input and a serial output which uses a type of 8B9B data encoding for transmission over a serial communication link having a clock recovery circuit at a receiving end, comprising:

a parallel register for temporarily storing each eight-bit parallel group of data bits for encoding;

an octal 2-to 1 multiplexer;

an encoder having eight parallel inputs and eight parallel outputs;

the parallel register having parallel outputs which are connected to eight inputs of the octal 2-to-1 multiplexer and also to the eight inputs of the encoder;

a counter having a serial input and a four bit binary output;

a parallel to serial shift register for temporarily storing each eight-bit parallel group of data bits and serially shifting each eight-bit group to the serial input of the counter;

the counter counts a number of logic 1's in each eight-bit group of data bits and outputs a binary number corresponding to a number of logic 1's in each eight-bit group of data bits;

a tag bit logic circuit is connected to the four bit binary output of the serial counter and receives the binary number corresponding to the number of logic 1's in each eight-bit group of data bits, and also has an output which is one of nine outputs that provide a nine bit group that respectively corresponds to each eight-bit group of data bits;

the tag bit logic circuit outputs a logic 1 if the number of logic 1's in the present eight-bit group of data bits is two, three or four, and outputs a logic 0 if the number of logic 1's in the present eight-bit group of data bits is zero, one, five, six, seven or eight;

the tag bit logic circuit also outputs a select output that is a logic 0 if the number of logic 1's in the present eight-bit group is two, three, four, five, or six, and a logic 1 if the number of logic 1's in the present eight-bit group is zero, one, seven or eight;

the select output is connected to a select output of the octal 2-to-1 multiplexer to select either a first set of eight inputs, which are connected to the parallel register, to switch to an eight line output, or a second set of eight inputs, which are connected to the outputs of the encoder, to switch to the eight line output;

the encoder circuit encodes eighteen eight-bit groups of data bits having a number of logic 1's equal to 0, 1, 7, or 8, to eighteen eight-bit groups having four logic 1's, and a nine-bit parallel to serial shift register having nine parallel inputs connected to the eight outputs of the octal 2-to-1 multiplexer and the tag bit output and a serial output connected to the system serial output terminal;

wherein each eight-bit group of data bits is translated into a respective nine bit group of data bits and each nine bit groups has at least three logic 1's and no more than six logic 1's contained therein to facilitate clock recovery from the serial data.

12. The system as set forth in claim 11, wherein the encoder uses combinational logic to encode the eighteen eight-bit groups of data bits having a number of logic 1's equal to 0, 1, 7, or 8 into respective predetermined nine-bit groups having four logic 1's and logic 0's.

13. The system as set forth in claim 11, wherein the tag bit logic circuit uses combinational logic to produce a tag bit that is concatenated with the output of the octal 2-to-1 multiplexer to form each nine-bit group of data bits.

14. The system as set forth in claim 11, wherein the tag bit logic circuit uses combinational logic to produce a tag bit that is concatenated with the output of the octal 2-to-1 multiplexer to form each nine-bit group of data bits and to produce a select output that either selects unaltered eight-bit groups of data bits or encoded eight-bit groups of data bits to concatenate with the tag bit.

15. The system as set forth in claim 14, wherein each of the encoded eight-bit groups contain four logic 1's and logic 0's.

16. A system having an eight-bit parallel input, a serial link and an eight-bit parallel output which uses a type of 8B9B data encoding, comprising:

a parallel register for temporarily storing each eight-bit parallel group of data bits for encoding;

an octal 2-to-1 multiplexer;

an encoder having eight parallel inputs and eight parallel outputs;

the parallel register having parallel outputs which are connected to eight inputs of the octal 2-to-1 multiplexer and also to the eight inputs of the encoder;

a counter having a serial input and a four bit binary output;

a parallel to serial shift register for temporarily storing each eight-bit parallel group of data bits and serially shifting each eight-bit group to the serial input of the counter;

the counter counts a number of logic 1's in each eight-bit group of data bits and outputs a binary number corresponding to a number of logic 1's in each eight-bit group of data bits;

a tag bit logic circuit is connected to the four bit binary output of the serial counter and receives the binary number corresponding to the number of logic 1's in each eight-bit group of data bits, and also has an output which is one of nine outputs that provide a nine bit group that respectively corresponds to each eight-bit group of data bits;

the tag bit logic circuit outputs a logic 1 if the number of logic 1's in the present eight-bit group of data bits is two, three or four, and outputs a logic 0 if the number of logic 1's in the present eight-bit group of data bits is zero, one, five, six, seven or eight;

the tag bit logic circuit also outputs a select output that is a logic 0 if the number of logic 1's in the present eight-bit group is two, three, four, five, or six, and a logic 1 if the number of logic 1's in the present eight-bit group is zero, one, seven or eight;

the select output is connected to a select output of the octal 2-to-1 multiplexer to select either a first set of eight inputs, which are connected to the parallel register, to switch to an eight line output, or a second set of eight inputs, which are connected to the outputs of the encoder, to switch to the eight line output;

the encoder circuit encodes eighteen eight-bit groups of data bits having a number of logic 1's equal to 0, 1, 7, or 8, into eighteen eight-bit groups having four logic 1's, and a nine-bit parallel to serial shift register having nine parallel inputs connected to the eight outputs of the octal 2-to-1 multiplexer and the tag bit output and a serial output connected to the system serial output terminal;

a serial data transmitter having an input connected to the nine-bit parallel to serial shift register and an output;

serial data transporting means having an input connected to the output of the serial data transmitter and an output;

a serial data receiver having an input connected to the output of the serial transporting means and an output;

a serial to nine-bit parallel shift register having a serial input connected to the output of the serial data receiver, and a nine-bit parallel output which outputs the tag bit and the encoded eight-bit group of data bits;

a second parallel register for temporarily storing each encoded eight-bit group of data bits for decoding;

a second octal 2-to-1 multiplexer;

a decoder having eight parallel inputs and eight parallel outputs;

the second parallel register having parallel outputs which are connected to eight inputs of the second octal 2-to-1 multiplexer and also to the eight inputs of the decoder;

a second counter having a serial input and a four-bit binary output;

a second parallel to serial shift register for temporarily storing each encoded eight-bit parallel group of data bits and serially shifting each eight-bit group to the serial input of the second counter;

the second counter counts a number of logic 1's in each encoded eight-bit group of data bits and outputs a binary number corresponding to a number of logic 1's in each eight-bit group of data bits;

a tag bit decoding logic circuit is connected to the four-bit binary output of the second serial counter and receives the binary number corresponding to the number of logic 1's in each encoded eight-bit group of data bits, and the tag bit decoding logic circuit also is connected to the tag bit output of the serial to parallel nine-bit shift register;

the tag bit decoding logic circuit outputs a select output that is a logic 0 if the number of logic 1's in the present encoded eight-bit group is two, three, five or six, or four and the tag bit is logic 1; and a logic 1 if the number of logic 1's in the present eight-bit group is four and the tag bit is logic 0;

the select output is connected to a select output of the second octal 2-to-1 multiplexer to select either a first set of eight inputs, which are connected to the second parallel register, to switch to an eight line output, or a second set of eight inputs, which are connected to the outputs of the decoder, to switch to the eight line output; and the decoder circuit decodes the eighteen encoded eight-bit groups of data bits having a number of logic 1's equal four back to eight-bit groups having 0, 1, 7, or 8, four logic 1's;

wherein each eight-bit group of data bits is translated into a respective nine bit group of data bits and each nine-bit groups has at least three logic 1's and no more than six logic 1's contained therein to facilitate clock recovery from the serial data and each nine-bit group of data bits is translated back to its respective eight-bit group of data bits for data communication.

* * * * *